United States Patent
Norman et al.

(10) Patent No.: US 9,163,721 B2
(45) Date of Patent: Oct. 20, 2015

(54) PILOT DOWNSHIFTING SYSTEM AND METHOD

(71) Applicant: Ford Global Technologies, LLC, Dearborn, MI (US)

(72) Inventors: Kristofor Robert Norman, Canton, MI (US); Shuya Shark Yamada, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/698,477

(22) Filed: Apr. 28, 2015

(65) Prior Publication Data

US 2015/0226320 A1    Aug. 13, 2015

Related U.S. Application Data

(63) Continuation of application No. 13/672,604, filed on Nov. 8, 2012, now Pat. No. 9,017,217.

(51) Int. Cl.
| | |
|---|---|
| *F16H 59/32* | (2006.01) |
| *F16H 61/02* | (2006.01) |
| *B60W 30/188* | (2012.01) |
| *F02B 29/04* | (2006.01) |
| *F02D 41/00* | (2006.01) |
| *B60W 10/06* | (2006.01) |
| *B60W 10/11* | (2012.01) |

(52) U.S. Cl.
CPC ........... *F16H 61/0213* (2013.01); *B60W 10/06* (2013.01); *B60W 10/11* (2013.01); *B60W 30/1884* (2013.01); *F02B 29/0468* (2013.01); *F02D 41/0007* (2013.01); *F16H 59/32* (2013.01)

(58) Field of Classification Search
None
See application file for complete search history.

(56) References Cited

U.S. PATENT DOCUMENTS

| | | | |
|---|---|---|---|
| 8,694,216 B2 | 4/2014 | Swartling et al. | |
| 8,974,346 B2 | 3/2015 | Glugla et al. | |
| 9,004,046 B2 | 4/2015 | Glugla et al. | |
| 2006/0195242 A1 | 8/2006 | Yamamoto et al. | |
| 2010/0058748 A1 | 3/2010 | Styles et al. | |
| 2011/0263383 A1* | 10/2011 | Ostberg et al. | 477/174 |
| 2012/0090584 A1 | 4/2012 | Jung | |
| 2014/0100074 A1 | 4/2014 | Glugla | |
| 2014/0100758 A1 | 4/2014 | Glugla et al. | |
| 2014/0123963 A1* | 5/2014 | Glugla et al. | 123/542 |
| 2014/0128221 A1 | 5/2014 | Glugla et al. | |

FOREIGN PATENT DOCUMENTS

| | | |
|---|---|---|
| JP | H08338516 A | 12/1996 |
| WO | 2011149409 A1 | 12/2011 |

\* cited by examiner

*Primary Examiner* — Justin Holmes
(74) *Attorney, Agent, or Firm* — Julia Voutyras; Alleman Hall McCoy Russell & Tuttle

(57) ABSTRACT

Methods and systems are provided for performing a multiple gear downshift of a transmission gear by transiently operating in an intermediate gear. In response to air mass flow not reaching a threshold for CAC self-cleansing for a set duration, the transmission gear may be downshifted from a higher gear to an intermediate gear, and then to a requested lower gear. Downshifting through an intermediate gear may also be controlled based on the gear shift request and maximum air mass flow levels for engine misfire.

21 Claims, 5 Drawing Sheets

PILOT DOWNSHIFTING SYSTEM AND METHOD

CROSS REFERENCE TO RELATED APPLICATIONS

The present application is a continuation of U.S. patent application Ser. No. 13/672,604, entitled "PILOT DOWNSHIFTING SYSTEM AND METHOD," filed on Nov. 8, 2012, now U.S. Pat. No. 9,017,217, the entire contents of which are hereby incorporated by reference for all purposes.

BACKGROUND/SUMMARY

Turbo charged engines utilize a Charge Air Cooler (CAC) to cool compressed air from the turbocharger, before it enters the engine. Ambient air from outside the vehicle travels across the CAC to cool intake air passing through the inside of the CAC. Condensate may form in the CAC when the ambient air temperature decreases, or during humid or rainy weather conditions, where the intake air is cooled below the water dew point. When the intake air includes recirculated exhaust gasses, the condensate can become acidic and corrode the CAC housing. The corrosion can lead to leaks between the air charge, the atmosphere, and possibly the coolant in the case of water-to-air coolers. Condensate may accumulate in the CAC, and then be drawn into the engine at once during times of increased air mass flow, increasing the chance of engine misfire. Some CACs may have a self-cleanse mode which is activated during threshold levels of air mass flow that do not cause misfire. However, if the vehicle is not driven such that it reaches this threshold level, condensate may accumulate and then cause misfire by being drawn into the engine too quickly when downshifting from a higher to a lower transmission gear at wide open throttle. Air mass flow may increase to higher levels, increasing the chance of engine misfire, during multiple gear downshifts.

Other attempts to address engine misfire due to condensate ingestion involve avoiding condensate build-up. However, the inventors herein have recognized potential issues with such methods. Specifically, while some methods may reduce or slow condensate formation in the CAC, condensate may still build up over time. If this build-up cannot be stopped, ingestion of the condensate during downshifting, specifically during downshifts that skip one or more intermediate gears, may increase the chance of engine misfire.

In one example, the issues described above may be addressed by a method for performing a multiple gear downshift in stages, controlling the increase in air mass flow and condensate purging from the CAC. Specifically, a transmission gear may be downshifted from a higher gear to a lower gear by transiently operating in an intermediate gear before shifting to the lower gear. In this way, condensate may be purged from the CAC at a lower air mass flow, while in the intermediate gear. Thus, when finally downshifting to the lower gear, engine misfire may not occur due to increased air mass flow.

As one example, in response to a multiple gear downshift request, a transmission gear may be downshifted from a higher gear to a lower gear. If the requested downshift increases air mass flow above a threshold level, engine misfire may occur if the amount of boost or amount condensate in the CAC have reached threshold levels. The CAC may self-cleanse (purge condensate) when air mass flow reaches a threshold range. However, if air mass flow remains below the threshold range for a threshold duration, condensate may accumulate in the CAC and the threshold boost level and/or threshold level of condensate may be reached. Once these conditions have been reached, misfire may be reduced by controlling the execution of a requested multiple gear downshift. For example, in response to a multiple gear downshift request that will increase air mass flow over a threshold level, when air mass flow is less than a threshold range for a threshold duration, the transmission gear may be downshifted from a higher gear to an intermediate gear, and then to the requested lower gear. By holding the transmission gear at the intermediate gear for a duration, condensate may be blown off the CAC and into the engine at a slower rate. Then, when shifting to the lower gear, the increase in air mass flow may not cause engine misfire since stored condensate has already been purged from the CAC. In this way, engine misfire may be reduced during multiple gear downshifts by utilizing an intermediate gear to control the increase in air mass flow and resulting condensate purging from the CAC.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
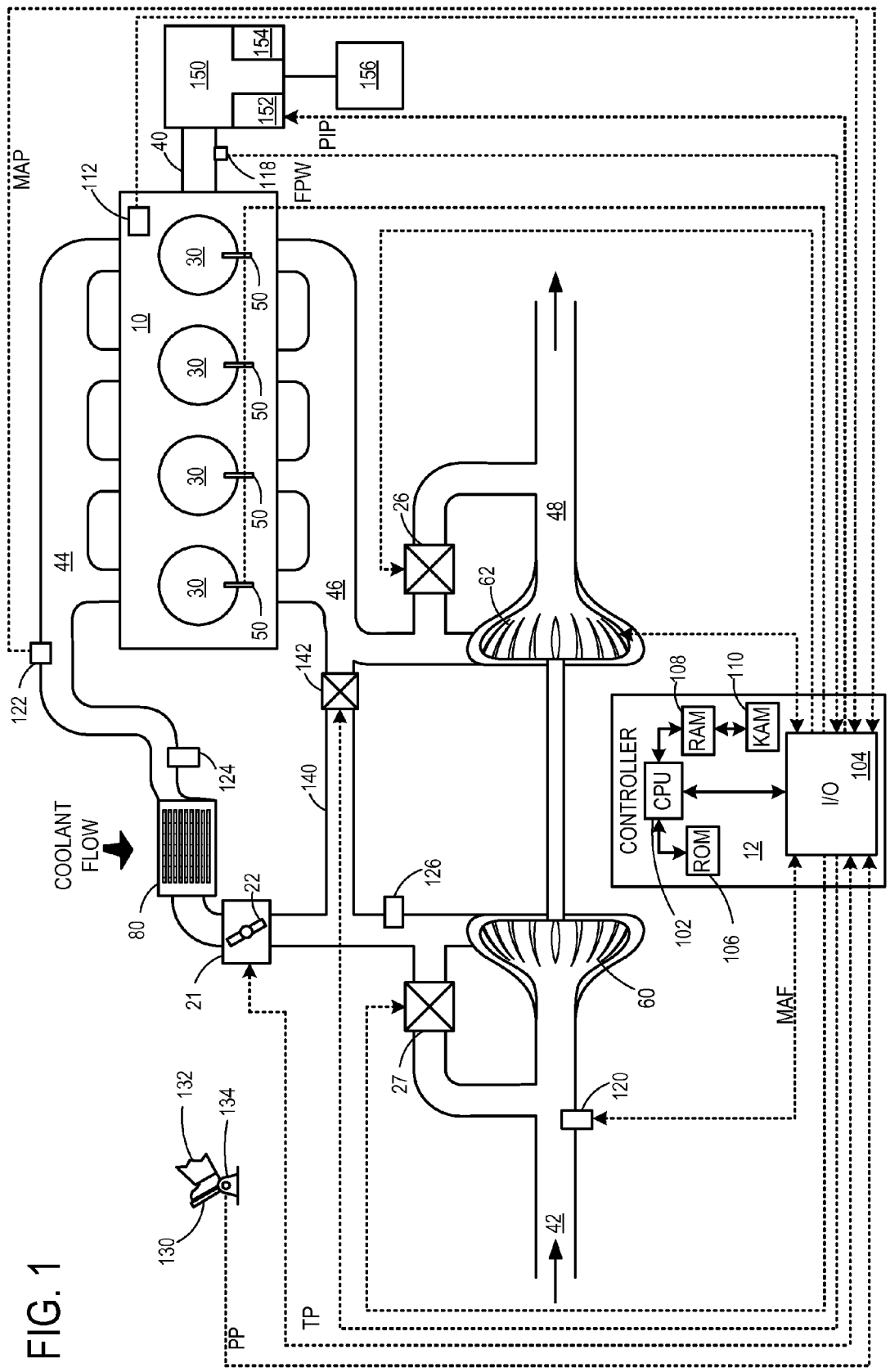
FIG. 1 is a schematic diagram of an example engine system including a charge air cooler.

The following description relates to systems and methods for performing a multiple gear downshift of a transmission gear in an engine system, such as the system of FIG. 1. A gear shift request may be generated in response to a change in pedal position. A method for shifting a transmission gear in response to varying shifting requests is presented in FIG. 2. In response to a request to shift to a new gear, the transmission may upshift to a higher gear, downshift by a single gear, or downshift by multiple gears. A multiple gear downshift may either be performed directly from a higher to a lower gear or in stages, by temporarily downshifting to an intermediate gear based on factors related to condensate release in the charge air cooler. A controller may perform a control routine, such as the routine of FIG. 3, to determine if an intermediate gear may be used, based on engine operating conditions such as air mass flow levels. The routine may then include performing the multiple gear downshift by utilizing the chosen intermediate gear. Example shifting operations are shown at FIG. 4. In this way, condensate can be purged at a slower rate from a CAC by downshifting first to an intermediate gear and then to a lower gear in order to reduce engine misfire.

FIG. 1 is a schematic diagram showing an example engine 10, which may be included in a propulsion system of an automobile. The engine 10 is shown with four cylinders 30. However, other numbers of cylinders may be used in accordance with the current disclosure. Engine 10 may be controlled at least partially by a control system including controller 12, and by input from a vehicle operator 132 via an input device 130. In this example, input device 130 includes an accelerator pedal and a pedal position sensor 134 for generating a proportional pedal position signal PP. Each combustion chamber (e.g., cylinder) 30 of engine 10 may include combustion chamber walls with a piston (not shown) positioned therein. The pistons may be coupled to a crankshaft 40 so that reciprocating motion of the piston is translated into rotational motion of the crankshaft. Crankshaft 40 may be coupled to at least one drive wheel of a vehicle via an intermediate transmission system 150. The transmission system 150 may include a multiple fixed gear automatic transmission having a plurality of discrete gear ratios, clutches, etc. In one example, the transmission may have only 8 discrete forward gears and 1 reverse gear. Further, a starter motor may be coupled to crankshaft 40 via a flywheel to enable a starting operation of engine 10.

An engine output torque may be transmitted to a torque converter (not shown) to drive the automatic transmission system 150. Further, one or more clutches may be engaged, including forward clutch 154, to propel the automobile. In one example, the torque converter may be referred to as a component of the transmission system 150. Further, transmission system 150 may include a plurality of gear clutches 152 that may be engaged as needed to activate a plurality of fixed transmission gear ratios. Specifically, by adjusting the engagement of the plurality of gear clutches 152, the transmission may be shifted between a higher gear (that is, a gear with a lower gear ratio) and a lower gear (that is, a gear with a higher gear ratio). As such, the gear ratio difference enables a lower torque multiplication across the transmission when in the higher gear while enabling a higher torque multiplication across the transmission when in the lower gear. The vehicle may have six available gears, where transmission gear six (transmission sixth gear) is the highest available gear and transmission gear one (transmission first gear) is the lowest available gear. In other embodiments, the vehicle may have more or less than six available gears.

As elaborated herein, a controller may vary the transmission gear (e.g., upshift or downshift the transmission gear) to adjust an amount of torque conveyed across the transmission and torque converter to vehicle wheels 156 (that is, an engine shaft output torque). Changes in the pedal position signal (PP), in combination with vehicle speed, may indicate to the controller that a change in transmission gear is requested. For example, as vehicle speed increases, the controller may upshift a transmission gear (e.g., from a transmission first gear to a transmission second gear). In one example, the controller may downshift a transmission gear when pedal position increases at a constant vehicle speed. At a relatively constant throttle opening, as vehicle speed increases, a transmission gear may be upshifted. Then, as pedal position increases, more torque demand may be requested, causing the transmission to downshift a transmission gear. Then, as vehicle speed increases, the transmission gear may be upshifted again. Alternatively, as PP decreases at a given vehicle speed, the controller may downshift a transmission gear (e.g., from a transmission third gear to a transmission second or first gear). The vehicle may upshift or downshift by one or more transmission gears. Under certain circumstances, the vehicle may perform a multiple gear upshift or downshift. For example, downshifts that skip one or more intermediate gears may be referred to as multiple gear downshifts. In one example, the vehicle may be traveling in a higher gear when the PP increases by a large amount, such as when the pedal is depressed fully (wide open pedal (WOP)). In this situation, the controller may downshift by multiple gears in order to increase engine speed torque. The lower gears may then result in higher engine speed (RPM) and vehicle acceleration. For example, the controller may downshift from a sixth transmission gear to second transmission gear. Thus, the transmission may "skip" three gears and downshift by four gears. In this way, multiple gear downshifts may be responsive to large increases in pedal position, such as WOP, as compared to smaller increases in pedal position with a downshift among two neighboring gears (e.g., $6^{th}$ to $5^{th}$).

As the vehicle downshifts a transmission gear, and the throttle is opened, the engine speed increases. This increases the air mass flow rate (e.g., air mass flow or mass air flow) through the engine. As such, at lower gears, the air mass flow increases. The controller may measure air mass flow from a mass air flow (MAF) sensor 120, which can approximate the airflow through a charge air cooler. The controller may then use this information to control other engine components and processes, such as gear shifting. This will be explained further below with respect to a charge air cooler and FIGS. 2-4.

Controller 12 is shown in FIG. 1 as a microcomputer, including microprocessor unit 102, input/output ports 104, an electronic storage medium for executable programs and calibration values shown as read only memory chip 106 in this particular example, random access memory 108, keep alive memory 110, and a data bus. Controller 12 may receive various signals from sensors coupled to engine 10 for performing various functions to operate engine 10, in addition to those signals previously discussed, including measurement of inducted air mass flow from MAF sensor 120; engine coolant temperature (ECT) from temperature sensor 112, shown schematically in one location within the engine 10; a profile ignition pickup signal (PIP) from Hall effect sensor 118 (or other type) coupled to crankshaft 40; the throttle position (TP) from a throttle position sensor, as discussed; and absolute manifold pressure signal, MAP, from sensor 122, as discussed. Engine speed signal, RPM, may be generated by controller 12 from signal PIP. Manifold pressure signal MAP from a manifold pressure sensor may be used to provide an indication of vacuum, or pressure, in the intake manifold 44. Note that various combinations of the above sensors may be used, such as a MAF sensor without a MAP sensor, or vice versa. During stoichiometric operation, the MAP sensor can give an indication of engine torque. Further, this sensor, along with the detected engine speed, can provide an estimate of charge (including air) inducted into the cylinder. In one example, sensor 118, which is also used as an engine speed sensor, may produce a predetermined number of equally spaced pulses every revolution of the crankshaft 40.

Other sensors that may send signals to controller 12 include a temperature sensor 124 at an outlet of a charge air cooler 80, and a boost pressure sensor 126. Other sensors not depicted may also be present, such as a sensor for determining the intake air velocity at the inlet of the charge air cooler, and other sensors. In some examples, storage medium read-only memory 106 may be programmed with computer readable data representing instructions executable by microprocessor unit 102 for performing the methods described below as well as other variants that are anticipated but not specifically listed. Example routines are described herein at FIG. 4.

Combustion chambers 30 may receive intake air from intake manifold 44 via intake passage 42 and may exhaust combustion gases via exhaust manifold 46 to exhaust passage 48. Intake manifold 44 and exhaust manifold 46 can selectively communicate with combustion chamber 30 via respective intake valves and exhaust valves (not shown). In some embodiments, combustion chamber 30 may include two or more intake valves and/or two or more exhaust valves.

Fuel injectors 50 are shown coupled directly to combustion chamber 30 for injecting fuel directly therein in proportion to the pulse width of signal FPW received from controller 12. In this manner, fuel injector 50 provides what is known as direct injection of fuel into combustion chamber 30; however it will be appreciated that port injection is also possible. Fuel may be delivered to fuel injector 50 by a fuel system (not shown) including a fuel tank, a fuel pump, and a fuel rail.

Intake passage 42 may include throttle 21 having a throttle plate 22 to regulate air flow to the intake manifold. In this particular example, the position (TP) of throttle plate 22 may be varied by controller 12 to enable electronic throttle control (ETC). In this manner, throttle 21 may be operated to vary the intake air provided to combustion chamber 30 among other engine cylinders. In some embodiments, additional throttles may be present in intake passage 42, such as a throttle upstream of the compressor 60 (not shown).

Further, in the disclosed embodiments, an exhaust gas recirculation (EGR) system may route a desired portion of exhaust gas from exhaust passage 48 to intake passage 42 via EGR passage 140. The amount of EGR provided to intake passage 42 may be varied by controller 12 via EGR valve 142. Under some conditions, the EGR system may be used to regulate the temperature of the air and fuel mixture within the combustion chamber. FIG. 1 shows a high pressure EGR system where EGR is routed from upstream of a turbine of a turbocharger to downstream of a compressor of a turbocharger. In other embodiments, the engine may additionally or alternatively include a low pressure EGR system where EGR is routed from downstream of a turbine of a turbocharger to upstream of a compressor of the turbocharger. When operable, the EGR system may induce the formation of condensate from the compressed air, particularly when the compressed air is cooled by the charge air cooler, as described in more detail below.

Engine 10 may further include a compression device such as a turbocharger or supercharger including at least a compressor 60 arranged along intake manifold 44. For a turbocharger, compressor 60 may be at least partially driven by a turbine 62, via, for example a shaft, or other coupling arrangement. The turbine 62 may be arranged along exhaust passage 48. Various arrangements may be provided to drive the compressor. For a supercharger, compressor 60 may be at least partially driven by the engine and/or an electric machine, and may not include a turbine. Thus, the amount of compression provided to one or more cylinders of the engine via a turbocharger or supercharger may be varied by controller 12.

Further, exhaust passage 48 may include wastegate 26 for diverting exhaust gas away from turbine 62. Additionally, intake passage 42 may include a compressor recirculation valve (CRV) 27 configured to divert intake air around compressor 60. Wastegate 26 and/or CRV 27 may be controlled by controller 12 to be opened when a lower boost pressure is desired, for example.

Intake passage 42 may further include charge air cooler (CAC) 80 (e.g., an intercooler) to decrease the temperature of the turbocharged or supercharged intake gases. In some embodiments, charge air cooler 80 may be an air to air heat exchanger. In other embodiments, charge air cooler 80 may be an air to liquid heat exchanger. CAC 80 may also be a variable volume CAC. Hot charge air (boosted air) from the compressor 60 enters the inlet of the CAC 80, cools as it travels through the CAC, and then exits to enter the engine intake manifold 44. Ambient air flow from outside the vehicle may enter engine 10 through a vehicle front end and pass across the CAC, to aid in cooling the charge air. Condensate may form and accumulate in the CAC when the ambient air temperature decreases, or during humid or rainy weather conditions, where the charge air is cooled below the water dew point. When the charge air includes recirculated exhaust gasses, the condensate can become acidic and corrode the CAC housing. The corrosion can lead to leaks between the air charge, the atmosphere, and possibly the coolant in the case of water-to-air coolers. Increased airflow through the CAC may purge condensate from the CAC. However, if too much condensate is introduced at once into the engine, it may increase the chance of engine misfire due to the ingestion of water.

In some cases, some intake air may bypass the compressor via the CRV 27. Unboosted air (air that doesn't pass through the compressor) may be below atmospheric pressure and therefore not condense in the CAC. A manifold pressure may be measured by sensor 122 and sent as an absolute manifold pressure signal, MAP, to the controller. The controller may use the MAP, along with the air mass flow, to determine an amount of boosted air (boost level). There may be a threshold boost level in which an amount of boosted air above this level may result in engine misfire. Specifically, as the boost level increases, condensate in the CAC may increase. Thus, the threshold boost level may correspond to an amount of condensate that may cause misfire if blown off into the engine too quickly (threshold level of condensate). The controller may determine an amount of time, or threshold duration, for the boosted air to reach this level, based on the average air mass flow and MAP.

Air mass flow may increase or decrease, depending on vehicle operating conditions. These conditions may include: whether or not the vehicle is towing a load and which transmission gear the vehicle is operating in. For example, air mass flow may be higher at a second transmission gear than a fourth transmission gear. In this way, as a transmission gear decreases (when downshifting), air mass flow increases. Further, air mass flow may increase to a greater level when downshifting by multiple gears. For example, when downshifting from a sixth to a fourth transmission gear, the air mass flow may increase to a first level. However, when downshifting from a sixth to a second transmission gear, the air mass flow may increase to a second level, greater than the first level.

As air mass flow increases, airflow through the CAC increases. This airflow may reach a level such that condensate is stripped from the CAC and into the intake manifold of the engine. Depending on the CAC design, a threshold level or range of air mass flow may cause condensate to be purged from the CAC. This threshold range or level may be low enough so that the condensate is blown off at a slow enough rate and misfire may not occur. In this way, each CAC may have a threshold range of air mass flow in which the CAC will self-cleanse, without causing misfire.

Additionally, there may be a second threshold level of air mass flow which purges condensate from the CAC and causes engine misfire if enough condensate has accumulated in the CAC (e.g., threshold level of condensate or threshold boost level). The air mass flow may reach this level during certain engine operating conditions, such as during a tip-in or during a large downshift. For example, during a multiple gear downshift at WOP, air mass flow may increase above the second threshold level; blowing off condensate from the CAC at an increased rate and increasing the chance engine misfire if enough condensate has accumulated. As the amount of downshift (number of transmission gears) increases, the air mass flow and chance of engine misfire increases. Different amounts of downshifting may result in the air mass flow increasing to below or above the second threshold level. For example, as explained above, downshifting from a sixth to a fourth transmission gear may increase the air mass flow to a first level. This first level may be below the second threshold level and not cause misfire. However, when downshifting from a sixth to a second transmission gear, the air mass flow may increase to a second level. The second level may be above the second threshold level and cause engine misfire.

Depending on the vehicle and engine operating conditions, the air mass flow may reach the threshold range for self-cleansing more or less often. If the threshold level (or range) for CAC self-cleansing is not reached within a threshold duration, d1, a threshold boost level may be reached (as described above). If the air mass flow then reaches the second threshold level, engine misfire may occur. For example, if the air mass flow has not reached the threshold range for the threshold duration d1 and the vehicle downshifts from a sixth transmission gear to a second transmission gear in response to WOP, engine misfire may occur. However, if the air mass flow has been above the threshold range within the threshold duration d1 and the vehicle performs the same downshift, engine misfire may not occur. In this way, if the air mass flow is below a threshold range for a threshold duration and air mass flow increases above the second threshold level, engine misfire may occur.

During conditions when air mass flow may increase above the second threshold and cause engine misfire, measures may be taken to increase air mass flow more slowly, decreasing the rate of condensate purging. This may be accomplished by a method for downshifting multiple transmission gears (e.g., downshifting by more than one transmission gear) in stages. For example, instead of shifting directly from a higher gear to a lower gear and possibly causing misfire, the controller may shift the transmission from a higher gear to an intermediate gear, and then to a lower gear. The intermediate gear may be held briefly (e.g., several seconds) before shifting to the lower gear. This may allow air mass flow to increase to a first, lower rate, allowing condensate to be blown off into the engine at a slower rate. Thus, the CAC may be quickly cleansed at the intermediate gear while reducing potential for misfire. In one example, condensate may be completely purged from the CAC at the intermediate gear. In another example, an amount of condensate may be purged at the intermediate gear such that the remaining amount of condensate may be purged at the lower gear without causing misfire. Thus, the duration in which the intermediate gear is held may be based on the amount of condensate in the CAC, the boost level, and the requested gear downshift. For example, at a higher boost level and larger amount of CAC condensate, the duration at the intermediate gear may be longer. In another example, when the requested gear downshift is smaller (e.g., downshifting by three gear rather than four gears), the duration at the intermediate gear may be shorter.

There may be many different combinations and situations for transiently operating in an intermediate gear when downshifting a transmission gear from a higher gear to a lower gear. Various combinations of higher, intermediate, and lower transmission gears may be used, depending on the downshift request and engine operating conditions. These engine operating conditions may include CAC condensate level, boost level, and air mass flow. In one example, the transmission may downshift from a sixth transmission gear to a fifth, intermediate, transmission gear, to a second gear (may be written as 6-4-2). In this example, the intermediate gear is the fourth transmission gear. In another example, the intermediate gear may be the fifth (6-5-2) or third (6-3-2) transmission gear. In a second example, the transmission may downshift from a fifth transmission gear to a fourth, intermediate, transmission gear, to second transmission gear (5-4-2). In another example, the intermediate gear may be the third transmission gear (5-3-2). Similar combinations may be used with an alternate higher gear (e.g., fourth transmission gear) and different intermediate and lower transmission gears.

In some cases, the downshift from the higher gear to the lower gear may not increase the air mass flow above the second threshold level and cause misfire. In this situation, the controller may not shift the transmission to the intermediate gear, but directly to the lower gear. In the cases in which an intermediate gear is needed, the selection of intermediate gear may be based on the level (or amount) of condensate in the CAC and/or the boost level. For example, if the amount of condensate in the CAC is high and the vehicle is to shift from the sixth to the second transmission gear, the intermediate gear may be higher (such as five vs. three). In this example, shifting 6-3-2 may cause misfire, whereas shifting 6-5-2 may increase air mass flow at a slower rate, reducing the chance of misfire. In this way, the intermediate gear may be closer to the higher gear when a boost level and level of condensate in the CAC is high. Alternatively, the intermediate gear may be closer to the lower gear when the boost level and level of condensate in the CAC is low.

In some embodiments, the controller may adjust engine torque when performing a multiple gear downshift in stages by transiently operating at an intermediate gear. Engine speed and air mass flow may increase both when shifting to the intermediate gear and when shifting to the final lower gear. In order to go unnoticed by the vehicle operator, engine torque may be adjusted at the intermediate gear if the throttle is not fully open. For example, adjustments to torque may only take place if the downshift is performed at part throttle when additional torque may be requested by opening up the throttle. If the downshift maneuver is performed at WOP, then a trade off of torque and acceleration rate may be made to minimize the risk of misfire. For example, some degradation of vehicle performance due to downshifting in stages may be less than the degradation and impact to emissions if a misfire occurs due to ingestion of condensate.

In this way, during select conditions and in response to a request to downshift a transmission gear from a higher gear to a lower gear, the transmission may transiently operate at an intermediate gear before shifting to the lower gear. As discussed above, these conditions may include operation below a threshold range of air mass flow for a threshold duration, d1. The threshold duration d1 may be based on the threshold boost level, the average air mass flow (or air mass flow over a time period), and the MAP.

Figure 2:
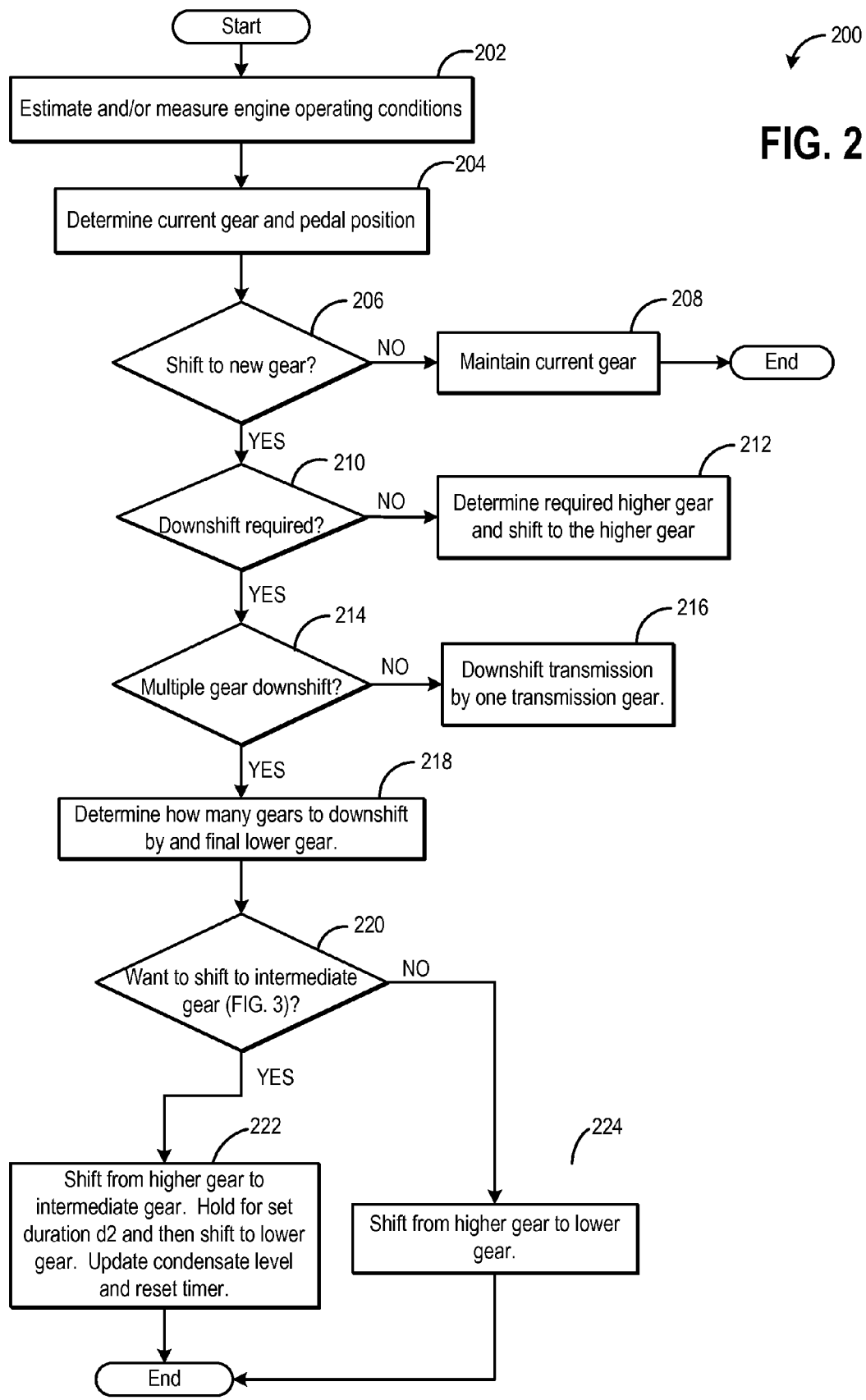
FIG. 2 shows a flow chart illustrating a method for shifting a transmission gear.

Turning now to FIG. 2, an example method 200 for shifting a transmission gear is depicted. In response to a request to shift to a new gear, the transmission may upshift to a higher gear, downshift by a single gear, or downshift by multiple gears. A multiple gear downshift request may either be performed directly (from a higher to a lower gear) or in stages, by briefly downshifting to an intermediate gear.

At 202, method 200 includes estimating and/or measuring engine operating conditions. These may include driver torque demand (based on a pedal position), engine speed (Ne) and load, ECT, boost level, ambient temperature and pressure, MAF, MAP, and current transmission gear. The routine determines the current gear and pedal position at 204. This information may be used at 206 to determine whether shifting to a new gear is required. If shifting is not required, the controller maintains the current gear at 208 and the method ends. However, if shifting to a new gear is required, the method proceeds to 210 where a downshift request is confirmed. If a downshift to a lower gear is not required, the routines determines the required higher gear at 212 and then shifts a transmission gear from the current gear to the higher gear. Alternatively, if a downshift is required at 210, the routine determines at 214 whether the required downshift is a multiple gear downshift (e.g., downshift from a sixth transmission gear to a third transmission gear). If only downshifting by a single gear is required, the routine downshifts the transmission by one transmission gear at 216. However, if a multiple gear downshift is required, the routine determines at 218 how many gears to downshift the transmission gear by and subsequently, the final lower gear.

At 220, the method includes determining whether the multiple gear downshift request may be performed directly or in stages, by briefly downshifting to an intermediate gear. Downshifting by shifting to an intermediate gear may be based on boost level, air mass flow, CAC condensate level, and the requested gear downshift. Details on this method are presented at FIG. 3. If shifting to an intermediate gear is not needed, the routine directly downshifts from the higher gear to the lower gear at 224. The timer for determining threshold duration d1 may be reset if air mass flow increases above the threshold range. Alternatively, if shifting to an intermediate gear is requested, the routine shifts from the higher gear to the intermediate gear at 222. The controller may hold the transmission at the intermediate gear for duration d2 and then shift to the lower gear. The condensate level in the CAC may be updated and the timer for threshold duration d1 may be reset. Additional details on the procedure at 222 are presented at FIG. 3.

Figure 3:
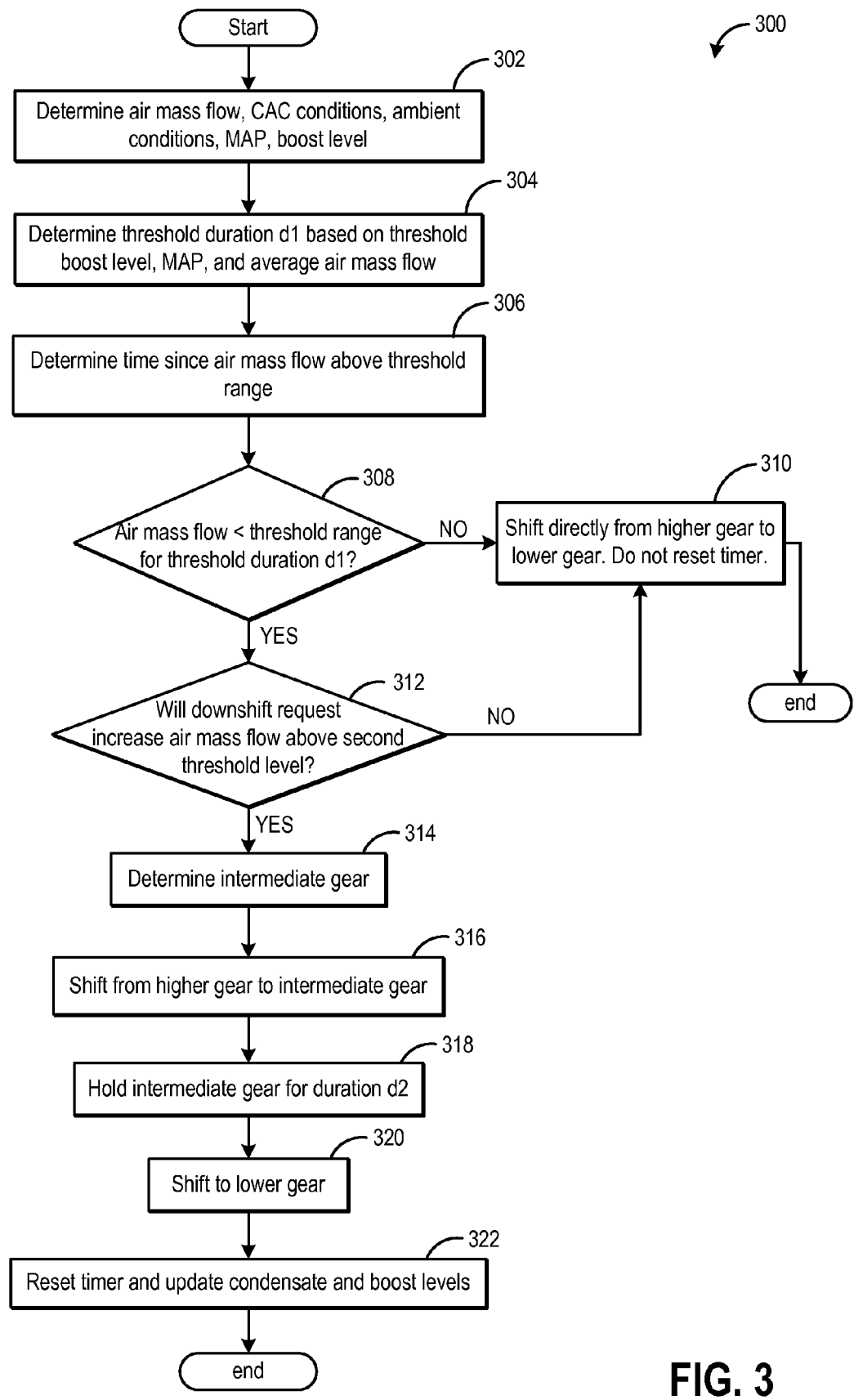
FIG. 3 shows a flow chart illustrating a method for performing a multiple gear downshift by transiently operating in an intermediate gear.
Figure 4:
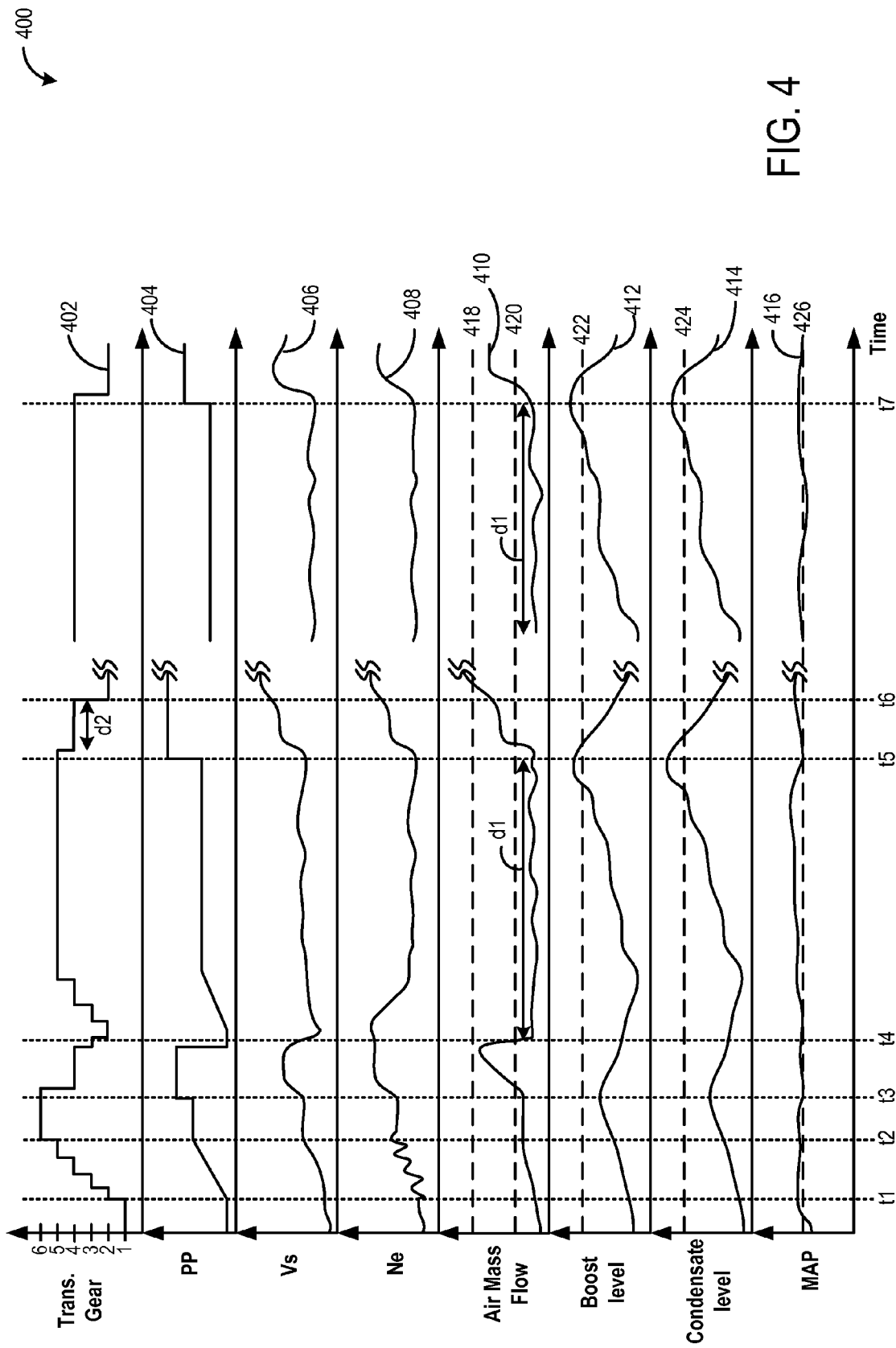
FIGS. 4-5 show example gear shifting operations during different driving conditions.

FIG. 3 illustrates an example method 300 for performing a downshift of a transmission gear from a higher gear to a lower gear. During select conditions, the transmission may transiently operate in an intermediate gear before shifting to the lower gear. At 302, method 300 includes determining the air mass flow (rate), CAC conditions (inlet and outlet temperature, inlet and outlet pressure, condensate level, etc.), ambient conditions (ambient temperature and humidity), MAP, and boost level. An amount or level of condensate in the CAC may be determined based on this data. In one example, a condensation formation value may be mapped to CAC outlet temperature and engine load. Engine load may be a function of air mass flow, torque, accelerator pedal position, and throttle position, and thus may provide an indication of the air flow velocity through the CAC. For example, a moderate engine load combined with a relatively cool CAC outlet temperature may indicate a high condensation formation value, due to the cool surfaces of the CAC and relatively low intake air flow velocity. The map may further include a modifier for ambient temperature. In still other examples, the ratio of CAC pressure to ambient pressure may be used as the indicator since there may be conditions where intake MAP is below atmospheric pressure, and engine load is relatively small, but pressure before the throttle is well above ambient pressure (~36 in Hg).

In another example, a rate of condensate formation within the CAC may be based on ambient temperature, CAC outlet temperature, air mass flow, EGR, and humidity. The ambient humidity value used to calculate condensate formation may either be assumed to be 100% or determined from various sensors. In one example, the ambient humidity may be determined based on the output of a humidity sensor coupled to the engine. In another example, humidity may be inferred from a downstream UEGO sensor or obtained from infotronics (e.g., internet connections, a vehicle navigation system, etc.) or a rain/wiper sensor signal. If the humidity is not known (for example, if the engine does not include a humidity sensor), the humidity may be set to 100%. The ambient temperature and humidity may be used to determine the dew point of the intake air, which may be further affected by the amount of EGR in the intake air (e.g., EGR may have a different humidity and temperature than the air from the atmosphere). The difference between the dew point and the CAC outlet temperature indicates whether condensation will form within the cooler, and the mass air flow may affect how much condensation actually accumulates within the cooler. An algorithm may calculate the saturation vapor pressure at the CAC outlet as a function of the CAC outlet temperature and pressure. The algorithm then calculates the mass of water at this saturation vapor pressure. Finally, the condensation formation rate at the CAC outlet is determined by subtracting the mass of water at the saturation vapor pressure condition at the CAC outlet from the mass of water in the ambient air. By determining the amount of time between condensate measurements, the controller may determine the amount (or level) of condensate within the CAC since a last measurement. The current condensate amount in the CAC is then calculated by adding the estimated condensate value to the previous condensate value and then subtracting any condensate losses since the last calculation (that is, an amount of condensate removed, for example, via purging routines). Condensate losses may be assumed to be zero if the CAC outlet temperature was above the dew point. Alternatively, the amount of condensate removed may be modeled or determined empirically as a function of air mass flow and integrated down with each software task loop.

Returning to FIG. 3, at 304 the method determines threshold duration d1, based on threshold boost level, MAP, and average air mass flow. Average air mass flow may be the average air mass flow since the previous measurement or average air mass flow over a set time range. As discussed above, threshold duration d1 may be the duration it takes for the boost level to reach a threshold boost level. Once the threshold boost level is reached, engine misfire may occur if air mass flow increases above the second threshold level. As such, the threshold boost level may correspond to an amount of condensate that may cause misfire if blown off into the engine too quickly (threshold level of condensate). In one example, a lower threshold boost level may result in a shorter threshold duration d1. In another example, a higher average air mass flow may result in a longer threshold duration d1. In this way, the controller may use the threshold boost and/or condensate levels, along with average air mass flow and MAP, to determine threshold duration d1. In some embodiments, the threshold duration d1 may be further based on the rate of or an amount of condensate formation in the CAC and ambient weather conditions. For example, conditions such as rain or high humidity that may increase condensate formation may cause threshold duration d1 to decrease.

The method at 306 includes determining the time since air mass flow was above a threshold range. As discussed above, the threshold range of air mass flow may be the level of air mass flow at which the CAC will self-cleanse. Specifically, when air mass flow reaches or increases above the threshold range of air mass flow, condensate may be stripped from the CAC into the engine without causing misfire. At 308, the routine determines if air mass flow has been below the threshold range for the threshold duration d1. If air mass flow has not met these conditions (e.g., air mass flow has been above the threshold range within the threshold duration d1), the routine continues to 310 were the transmission is shifted from a higher gear to a lower gear, as requested. However, if the air mass flow has not increased above the threshold range for the threshold duration d1, the routine continues on to 312. At 312, the routine determines if the current downshift request (e.g., amount of downshift) will increase the air mass flow above the second threshold level. If not, misfire may not occur and the transmission gear may be shifted from the higher gear to the requested lower gear, without transiently operating in an intermediate gear. However, if the downshift request will increase air mass flow above the second threshold level, shifting to an intermediate gear may be performed to avoid engine misfire.

At 314, the controller determines the intermediate gear. In some cases, there may only be one choice of intermediate gear. For example, when shifting from a fourth to a second transmission gear, the third transmission gear may be the only option for the intermediate gear. In other cases, there may be multiple intermediate gear options and the selection of intermediate gear may be based on the level (or amount) of condensate in the CAC and/or the boost level. For example, if the amount of condensate in the CAC is high and the vehicle must shift from the fifth to the second transmission gear, the intermediate gear may be higher (such as four vs. three). In this example, shifting 5-3-2 may cause misfire, whereas shifting 5-4-2 may increase air mass flow to a first, lower rate (at the intermediate gear), reducing the chance of misfire. The gear change may further be based on a target air mass flow rate at the newly selected gear so that condensate may be purged in such a manner as to reduce the chance of misfire.

After determining the intermediate gear at 314, the routine downshifts the transmission gear from the higher gear to the chosen intermediate gear at 316. The routine at 316 may also include adjusting engine torque. Torque adjustments may include, at part throttle, increasing throttle opening to maintain requested torque (limited by the maximum airflow that limits the ingestion of condensate level below the misfire rate). In the event a shift to a lower gear may result in more torque than requested, reducing throttle opening or retarding spark advance may be used to match the driver demanded torque level. The intermediate gear is held for duration d2 at 318. In one example, the duration d2 may be a pre-set value used for every downshift. In another example, duration d2 may be based on the amount of condensate in the CAC, the boost level, and the requested gear downshift. For example, at a higher boost level and larger amount of CAC condensate, the duration at the intermediate gear may be longer. In another example, when the requested gear downshift is smaller (e.g., downshifting by three gears rather than four gears), the duration at the intermediate gear may be shorter. After holding the intermediate gear for duration d2, the routine at 320 includes downshifting from the intermediate gear to the requested lower gear. Finally, at 322, the routine may reset the timer for duration d2 and update the condensate and boost levels. In this way, in response to a multiple gear downshift request, when air mass flow is less than a threshold range for a threshold duration and the multiple gear downshift request will increase air mass flow over a second threshold level, the transmission may be downshifted from a higher gear to an intermediate gear, and then to a requested lower gear. As such, condensate introduction from the CAC into the engine may be controlled, reducing engine misfire events.

Now turning to FIG. 4, graph 400 shows example transmission gear shifting operations during different driving conditions. Specifically, graph 400 shows a change in pedal position (PP) indicative of an operator torque demand at plot 404, a corresponding change in vehicle speed is shown at plot 406, and a change in engine speed (Ne or RPM) is shown at plot 408. A change in transmission gear is shown at plot 402 where 6 is the highest available gear and 1 is the lowest available gear. Further, graph 400 shows air mass flow (rate) at plot 410, boost level at plot 412, CAC condensate level at plot 414, and MAP at plot 416.

Prior to t1, pedal position may be at a low position, requesting a small amount of torque and vehicle speed (plot 406). As a result, the vehicle may begin in a transmission gear 1 (plot 402). At time t1, a vehicle operator may slowly apply pressure to the accelerator pedal, resulting in a gradual increase in pedal position (plot 404), vehicle speed (plot 406), and engine speed (plot 408). The increase in pedal position and vehicle speed may generate a request to upshift the transmission gear. As pedal position continues to increase from time t1 to time t2, the transmission gear is shifted into higher gears (plot 402). At time t2, pedal position becomes constant and the transmission gear is maintained at transmission gear 6.

At time t3, pedal position increases (plot 404) and, as a result, a downshift request is generated. A multiple gear downshift may be requested, based on the pedal position increase. The transmission may be requested to downshift by two transmission gears, from transmission gear 6 to transmission gear 4. At time t3, the boost level (plot 412) and condensate level (plot 414) remain below their threshold levels (422 and 424, respectively). Air mass flow (plot 410) has remained below a threshold range (or first threshold level) 420 for a duration shorter than threshold duration d1. Thus, in response to the air mass flow rate not being less than a threshold range for threshold duration d1, the transmission gear is shifted from a transmission gear 6 to transmission gear 4, without operating in an intermediate gear. Downshifting during the increase in pedal position at t3 results in an increase in vehicle speed (plot 406) and engine speed (plot 408). Additionally, in response to downshifting from higher transmission gear 6 to lower transmission gear 4, air mass flow increases between time t2 and time t3, reducing the condensate level in the CAC (CAC cleansing or purging). Boost level may decrease proportionately with condensate level to reset the boost level and reflect the amount of condensate remaining in the CAC after cleansing. Since boost level was below the boost level threshold 422 at t3, engine misfire may not occur during the condensate purging.

Between time t3 and t4 a tip-out may occur, causing the transmission to downshift a transmission gear and air mass flow to decrease. During this time, vehicle speed may continue to decrease. As pedal position again increases (plot 404), the transmission gear may be upshifted to higher gears, causing engine speed to decrease and air mass flow to decrease below threshold range 420 at time t4. The timer for duration d1 may be reset at this point. Between time t4 and time t5, air mass flow (plot 410) remains below threshold range 420 and MAP (plot 416) remains above atmospheric pressure 426, causing condensate level (plot 414) and boost level (plot 412) to continue to increase.

At time t5, pedal position increases rapidly, possibly indicating a WOP condition. This may generate a downshift request from the current transmission gear 5 to transmission gear 2. At this time, air mass flow may have been below the threshold range 420 for longer than threshold duration d1. Thus, in response, transmission gear 5 is first downshifted to intermediate transmission gear 4. Air mass flow increases to a level above threshold range 420 but below second threshold level 418. As a result, condensate is blown off the CAC and into the engine, causing condensate level (plot 414) to decrease below a threshold level of condensate 424 before time t6. The intermediate transmission gear 4 is held for duration d2. Then, at time t6, the transmission gear is downshifted from intermediate transmission gear 4 to lower transmission gear 2. Engine speed and vehicle speed increase with each downshift. Air mass flow increases above second threshold level 418 (plot 410), blowing off the remaining condensate from the CAC. Since condensate level dropped below the threshold level of condensate 424 before the additional increase in air mass flow, engine misfire does not occur.

In this way, transiently operating in an intermediate transmission gear allowed condensate to be blown off at a lower air mass flow, reducing the chance of misfire. If an intermediate gear were not used for the downshift at time t5, misfire may have occurred when downshifting directly from transmission gear 5 to transmission gear 2. In some embodiments, the duration d2 may be held such that all the condensate in the CAC is blown off at the intermediate gear before downshifting to the lower gear. In other embodiments, duration d2 may be held such that condensate falls below a threshold for misfire (such as threshold level of condensate 424) before downshifting from the intermediate gear to the lower gear.

Returning to graph 400, another sudden increase in pedal position occurs at time t7, after an amount of time has elapsed. Before time t7, pedal position (plot 404), vehicle speed (plot 406), and engine speed (plot 408) are at relatively constant levels. Air mass flow (plot 410) remains below threshold range 420 and boost level (plot 412) and condensate level (plot 414) are steadily increasing. Just before time t7, boost level increases above boost threshold level 422 and condensate level increases above the threshold level of condensate 424. At time t7, pedal position increases suddenly and a downshift request is generated. The downshift request at t7 may be from transmission gear 4 to transmission gear 2. In this example, downshifting from transmission gear 4 to transmission gear 2 may not increase air mass flow above second threshold level 418 and result in engine misfire. Thus, even though air mass flow has remained below threshold range 420 for threshold duration d1, the transmission gear is downshifted directly from transmission gear 4 to transmission gear 2 without operating in an intermediate gear. In an alternate example, the downshift from transmission gear 4 to transmission gear 2 may increase air mass flow above the second threshold level 418, resulting in first downshifting to an intermediate gear (in this case, transmission gear 3).

In the current example at time t7, air mass flow increases to a level between threshold range 420 and second threshold level 418 when downshifting from transmission gear 4 to transmission gear 2. This increase in air mass flow strips condensate from the CAC and into the engine, decreasing the condensate level in the CAC. In response to the downshift at time t7, engine speed and vehicle speed increase.

Thus, downshifting a transmission gear may be controlled based on air mass flow. During a first condition, as shown at time t5 in graph 400, when air mass flow is less than a threshold range for a threshold duration and downshifting from a higher gear to a requested lower gear will increase air mass flow over a second threshold level, a transmission gear may be shifted from the higher gear to the lower gear by transiently operating in an intermediate gear before shifting to the lower gear. Alternatively, during a second condition, as shown at time t3 in graph 400, when air mass flow is not less than a threshold range for a threshold duration, a transmission gear may be shifted from a higher gear to a lower gear when requested, without operating in an intermediate gear. In some examples, a multiple gear downshift may not increase air mass flow above a second threshold level such that it causes misfire. Thus, during a third condition, as shown at time t7 in graph 400, when air mass flow is less than a threshold range for a threshold duration and downshifting from a higher gear to a requested lower gear will not increase air mass flow over a second threshold level, a transmission gear may be shifted from a higher gear to a lower gear, without operating in an intermediate gear.

Figure 5:
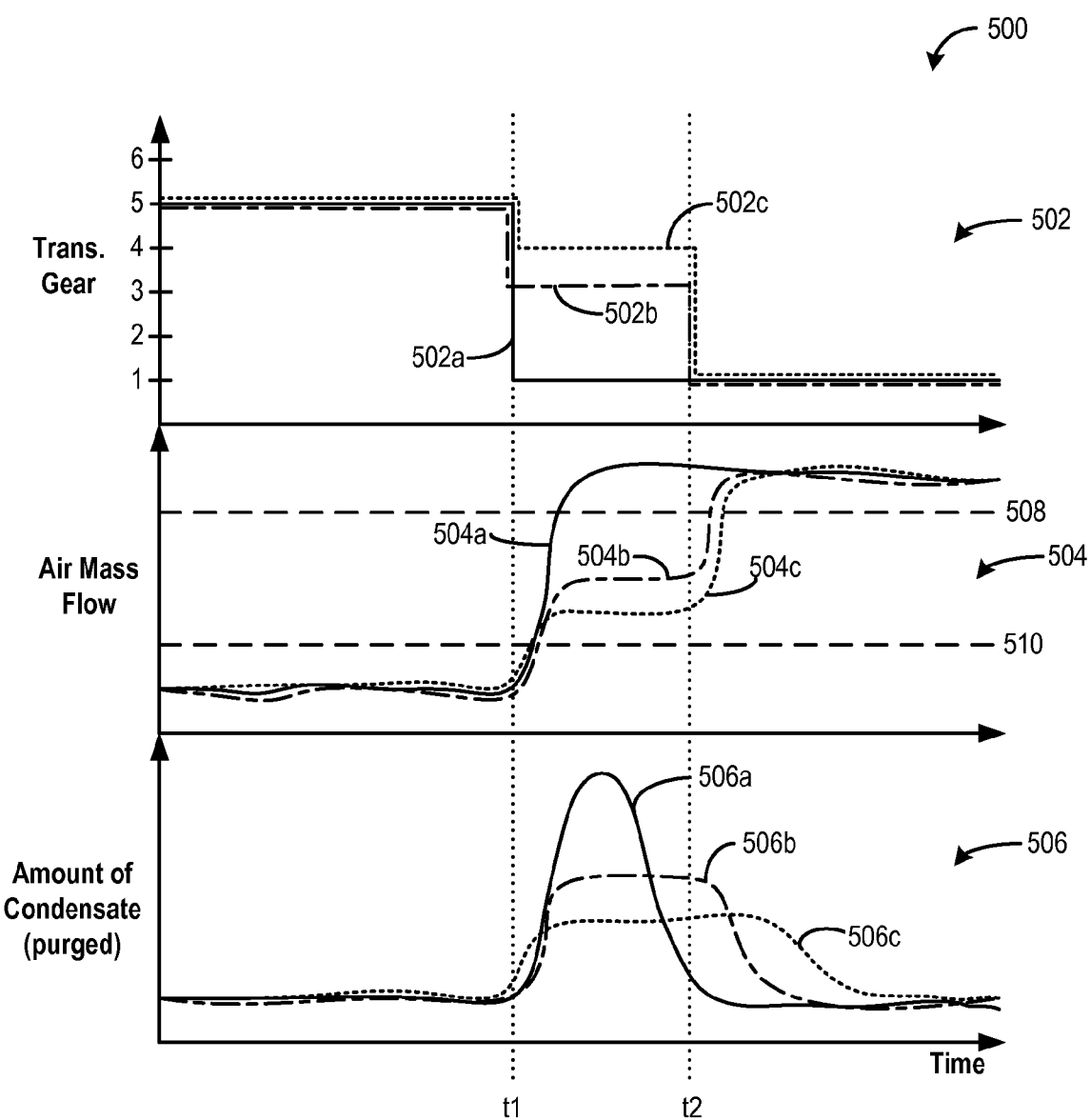

Additional transmission gear shifting operations are shown at FIG. 5. Herein, graph 500 illustrates three different downshifting operations and the resulting increase in air mass flow and amount of condensate purged from the CAC. Specifically, a change in transmission gear is shown at plot 502, air mass flow is shown at plot 504, and the amount of condensate purged from the CAC (e.g., condensate leaving the CAC) is shown at plot 506. Three different downshifting examples are shown (A, B, and C). Prior to time t1, the vehicle may be in transmission gear 5 with a relatively constant air mass flow in all three examples. In a first example, A, a transmission gear may be downshifted directly from transmission gear 5 to transmission gear 1 (plot 502*a*) at time t1. In response, air mass flow may increase above a second threshold level 508 (plot 504*a*). As air mass flow increases, the amount of condensate purged from the CAC increases (plot 506*a*). Since air mass flow increases quickly to a high level, condensate may be blown off at an increased rate. As a result, a larger amount of condensate may be purged from the CAC between time t1 and time t2. Since air mass flow increases above second threshold level 508 and blows off a large amount of condensate at once, engine misfire may occur in this example.

In a second example, B, the transmission gear may be downshifted from transmission gear 5 to an intermediate transmission gear 3 (plot 502*b*) at time t1. In response, air mass flow may increase to a level between a first threshold level 510 and second threshold level 508 (plot 504*b*). The increase in air mass flow causes condensate to be purged from the CAC (plot 506*b*). However, since air mass flow is lower than in first example A, condensate may be purged at a slower rate. As a result, less condensate may be purged from the CAC between time t1 and time t2. The intermediate gear may be held for a duration, from time t1 to time t2. Then, at time t2, the transmission gear may be downshifted from the intermediate transmission gear 3 to lower transmission gear 1. Air mass flow may increase above second threshold level 508 (plot 504*b*), purging the remaining condensate from the CAC. Only a small amount of condensate is purged from the CAC after time t2. Thus, since most of the condensate was purged with a smaller air mass flow at the intermediate gear, engine misfire may not occur. In an alternate example, the intermediate gear may be held for a slightly longer duration to allow all the condensate to purge form the CAC before downshifting to the lower gear. This may further decrease the chance of engine misfire.

While transmission gear 3 was chosen as the intermediate gear in second example B, other intermediate gears could have been used. For example, in a third example, C, the transmission gear may be downshifted from transmission gear 5 to an intermediate transmission gear 4 (plot 502*c*). In this example, the intermediate gear is closer to the higher gear (transmission gear 5). In response, air mass flow increases to a level between a first threshold level 510 and second threshold level 508 (plot 504*c*), but below the air mass flow level in second example B (plot 504*b*). Condensate is purged from the CAC at a slower rate than in the first two examples, due to the lower air mass flow level. Thus, between time t1 and time t2, less condensate is purged from the CAC (plot 506*c*). At time t2, the transmission gear is downshifted from the intermediate transmission gear 4 to lower transmission gear 1. Air mass flow may increase above second threshold level 508 (plot 504*c*), purging the remaining condensate from the CAC. A larger amount of condensate is purged form the CAC after time t2 than in the first two examples. However, since a portion of the total condensate in the CAC was purged while in the intermediate gear, engine misfire may not occur. In alternate examples, the intermediate gear may be held for a longer duration to further decrease the amount of condensate in the CAC and reduce the chance of engine misfire.

In this way, downshifting a transmission gear may be controlled in response to pedal position and air mass flow to reduce engine misfire events. In response to a multiple gear downshift request, the downshift may performed directly (from a higher to a lower gear) or in stages, by briefly downshifting to an intermediate gear. If air mass flow is below a threshold range for a threshold duration and a downshift request is received that will increase air mass flow above a second threshold level, the downshift may be performed in stages, using an intermediate gear. However, if air mass flow is not below a threshold range for a threshold duration, or the downshift request may not increase air mass flow above the second threshold level, the controller may perform the downshift directly, shifting from the higher transmission gear to the lower transmission gear, without utilizing an intermediate gear. Thus, based on air mass flow, threshold duration d1, and the specific downshift request, downshifting may be controlled to improve engine performance. By first downshifting to an intermediate gear during select conditions, the increase in air mass flow may be controlled to a level that safely purges condensate from the CAC without causing misfire.

Note that the example control routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, 1-4, 1-6, V-12, opposed 4, and other engine types. Further, one or more of the various system configurations may be used in combination with one or more of the described diagnostic routines. The subject matter of the present disclosure includes all novel and non-obvious combinations and sub-combinations of the various systems and configurations, and other features, functions, and/or properties disclosed herein.

The invention claimed is:

1. A method for controlling an engine, comprising:
boosting intake air through a compressor of a turbocharger;
direct injecting fuel into a cylinder of the engine; and
in response to airflow through a charge air cooler and a request to downshift a transmission gear from a higher gear to a lower gear, shifting the transmission gear from the higher gear, to an intermediate gear, and then to the lower gear, where the transmission transiently operates at the intermediate gear and engine torque is adjusted at the intermediate gear when an engine throttle is not fully open.

2. The method of claim 1, further comprising adjusting engine torque only when the downshift is performed at part throttle conditions, wherein the airflow through the charge air cooler is an air mass flow.

3. The method of claim 2, wherein the air mass flow is below a threshold range for a threshold duration.

4. The method of claim 1, further comprising operating at the intermediate gear when the request to downshift the transmission gear will increase the airflow above a second threshold level.

5. The method of claim 1, wherein the operating at the intermediate gear is further responsive to condensate in a charge air cooler being above a threshold level.

6. The method of claim 1, wherein the intermediate gear is held for a duration.

7. The method of claim 6, wherein the duration is one of a set duration and an amount of time for a charge air cooler condensate level to decrease below a threshold level.

8. The method of claim 3, wherein the threshold duration is based on a threshold boost level, manifold pressure, and the air mass flow.

9. The method of claim 3, wherein the threshold range of air mass flow is based on an air mass flow at which the charge air cooler will self-cleanse.

10. The method of claim 4, wherein the second threshold level is based on an air mass flow at which condensate is purged from the charge air cooler and causes engine misfire if one or more of a threshold boost level and threshold level of condensate has been reached.

11. The method of claim 1, wherein the intermediate gear is chosen based on one or more of a level of condensate in the charge air cooler and a boost level.

12. The method of claim 1, wherein the request to downshift the transmission gear is a multiple gear downshift request.

13. The method of claim 12, wherein the multiple gear downshift request is responsive to a large increase in pedal position, including wide open pedal.

14. A method for controlling an engine, comprising:
generating condensate in a charge-air-cooler (CAC) of the engine; and
in response to a multiple gear downshift request and based on estimated condensate formation in the CAC, when air mass flow is less than a threshold range for a threshold duration and the multiple gear downshift request will increase air mass flow over a second threshold level, downshifting a transmission from a higher gear to an intermediate gear to purge condensate, and then to a requested lower gear.

15. The method of claim 14, wherein the intermediate gear is held for a duration, the duration increasing with increasing boost level and amount of condensate in the CAC.

16. The method of claim 14, wherein the threshold duration decreases with decreasing threshold boost level and increasing average air mass flow.

17. The method of claim 14, wherein the threshold range of air mass flow is based on an airflow level which strips condensate from the CAC and into an intake manifold of the engine.

18. The method of claim 14, wherein the second threshold level is the air mass flow which purges condensate from the CAC and causes engine misfire if a threshold level of condensate has been reached.

19. The method of claim 14, wherein the intermediate gear is closer to the higher gear when a boost level and level of condensate in the CAC is high and the intermediate gear is closer to the lower gear when the boost level and level of condensate in the charge air cooler is low.

20. A method for controlling an engine, comprising:
during a first condition, when an air mass flow is less than a threshold range for a threshold duration, shifting from a higher gear to a requested lower gear by transiently operating at an intermediate gear before shifting to the lower gear;
during a second condition, when an air mass flow is not less than a threshold range for a threshold duration, shifting from the higher gear to a lower gear when requested, without operating in the intermediate gear; and
selecting between the first and second condition based on charge-air-cooler conditions.

21. The method of claim 20, wherein the first condition further includes when shifting from the higher gear to the requested lower gear will increase air mass flow over a second threshold level.

* * * * *